US012686092B2

(12) United States Patent
Greb et al.

(10) Patent No.: US 12,686,092 B2
(45) Date of Patent: Jul. 21, 2026

(54) COMPONENTS OF A MACHINE TOOL FOR AUTOMATED COLLET CHUCK MAINTENANCE AND CLEANING

(71) Applicant: Schmoll Maschinen GmbH, Rödermark-Oberroden (DE)

(72) Inventors: Erich Greb, Mainhausen (DE); Timo Mathias Scherer, Frankfurt (DE); Markus Winterschladen, Kahl (DE); Dominic Hanaman, Haibach (DE); Thomas Christlieb, Bruchköbel (DE)

(73) Assignee: Schmoll Maschinen GmbH, Rödermark-Oberroden (DE)

( * ) Notice: Subject to any disclaimer, the term of this patent is extended or adjusted under 35 U.S.C. 154(b) by 668 days.

(21) Appl. No.: 18/055,455

(22) Filed: Nov. 15, 2022

(65) Prior Publication Data

US 2023/0166373 A1 Jun. 1, 2023

(51) Int. Cl.
*B23B 31/26* (2006.01)
*B23B 31/20* (2006.01)
(Continued)

(52) U.S. Cl.
CPC ............ *B23Q 11/005* (2013.01); *B23B 31/26* (2013.01); *B23B 31/265* (2013.01); *B23B 31/30* (2013.01);
(Continued)

(58) Field of Classification Search
CPC . Y10T 409/309464; Y10T 409/304032; Y10T 408/44–46; Y10T 409/309408;
(Continued)

(56) References Cited

U.S. PATENT DOCUMENTS

| | | | |
|---|---|---|---|
| 7,125,208 B2 | 10/2006 | Schweizer |
| 2005/0095075 A1 | 5/2005 | Schweizer |

(Continued)

FOREIGN PATENT DOCUMENTS

| | | |
|---|---|---|
| CN | 104823529 A | 8/2015 |
| DE | 102010011000 A | 11/2011 |
| DE | 102020103984 A1 | 8/2021 |

*Primary Examiner* — Erica E Cadugan
(74) *Attorney, Agent, or Firm* — McDonnell Boehnen Hulbert & Berghoff LLP

(57) ABSTRACT

The invention relates to a spindle (1) of a machine tool, in particular a machine tool for machining workpieces, as well as to other components of a machine tool for in particular automatedly maintaining and cleaning collet chucks. To this end, the spindle (1) has a connecting plate (100) for connecting the spindle (1) to a compressed air unit and a lubricant supply of a machine tool, a shank element (110) that can be displaced in the longitudinal direction (L) of the spindle (1) and is mounted in the connecting plate (100) of the spindle (1), as well as a spindle shank (121) that can be rotated in the circumferential direction (U) of the spindle (1), with a connecting piece (124) for connecting a connecting element (202) of a collet chuck (200) set up to receive a processing tool or a maintenance tool (300) to the spindle. The shank element (110) has a through hole (113) in the longitudinal direction (L) of the spindle (1), wherein the connecting plate (100) has a lubricant inlet (105) for connection to the lubricant supply, and at least one separate compressed air inlet (104) for connection to the compressed air unit. The connecting plate is set up to fluidically connect the through hole (113) of the shank element (110) to the at least one compressed air inlet (104) as well as the lubricant inlet (105).

6 Claims, 8 Drawing Sheets

(51) Int. Cl.
  _B23B 31/30_      (2006.01)
  _B23Q 11/00_     (2006.01)
  _B23Q 11/10_     (2006.01)
  _B23B 31/00_     (2006.01)

(52) U.S. Cl.
  CPC ........ _B23Q 11/1015_ (2013.01); _B23B 31/001_
    (2013.01); _B23B 2231/24_ (2013.01); _B23Q_
    _2220/006_ (2013.01); _Y10T 409/304032_
    (2015.01); _Y10T 409/304088_ (2015.01); _Y10T_
    _409/309464_ (2015.01)

(58) Field of Classification Search
  CPC ........ Y10T 409/304088; B23B 31/26–31/268;
    B23Q 11/1015–11/103; B23Q 3/12; B23Q
    1/70; B23Q 11/005; B23Q 11/006; B23Q
    2220/006
  USPC ...... 409/233, 136, 231–232, 137; 408/56–61
  See application file for complete search history.

(56)           References Cited

U.S. PATENT DOCUMENTS

| 2007/0014647 | A1 | 1/2007 | Watzke | |
| 2012/0093605 | A1* | 4/2012 | Haas .................... | B23Q 11/103 |
| | | | | 184/6 |
| 2016/0074981 | A1* | 3/2016 | Mochizuki ......... | B23Q 11/1015 |
| | | | | 409/136 |

\* cited by examiner

L

117

108

117

117

118

108

119

120

COMPONENTS OF A MACHINE TOOL FOR AUTOMATED COLLET CHUCK MAINTENANCE AND CLEANING

CROSS REFERENCE TO RELATED APPLICATIONS

The present application claims priority to German Patent Application No. 10 2021 131 072.5, filed Nov. 26, 2021, the entire contents of which is incorporated herein for all purposes by this reference.

TECHNICAL FIELD

The present invention relates to a spindle of a machine tool, in particular a machine tool for machining workpieces, for example printed circuit boards, a collet chuck for connection to such a spindle, a maintenance tool for such a collet chuck, a machine tool, as well as a method for maintaining and cleaning a collet chuck of such a machine tool. The inventive components of a machine tool as well as the machine tool itself enable an automated maintenance of the collet chuck.

BACKGROUND

Modern machine tools require a precise manufacturing, for example to ensure the functionality of the manufactured products. These requirements on precision are especially high during the production of printed circuit boards, for example in which copper-plated holes are used to install electronic components or specifically connecting internal copper layers. In addition, an ever-advancing miniaturization of electronic components is providing for increasing precision requirements. The interplay between the tool and machine tool while machining workpieces, for example manufacturing holes, is crucially important to ensure compliance with the precision requirement, and hence compliance with a process-reliable and dimensionally accurate production. As a consequence, the interface between the tool and machine tool is crucial for compliance with the requirements described above.

As a rule, collet chucks are used for clamping tools, for example for clamping drills, into a machine tool, and connected to the rotating spindle of the machine tool for receiving the tool. A drive speed and drive torque are in this way transferred to the tool from a drive unit of the machine tool via the spindle and the collet chuck. In order to reliably transfer these process variables, the collet chuck must ensure a process-reliable clamping of the tool, for example a process-reliable force closure between the clamping surface of the collet chuck and tool shank. The quality of the force closure is sometimes determined by the holding torque, which counteracts an unintentional twisting of the tool shank in the collet chuck. Because the holding torque is sometimes conditioned by the cleanliness of the contact surfaces of the collet chuck and tool, contamination of these contact surfaces, i.e., contamination of the clamping surfaces of the collet chuck and contamination of the tool shank by chips and drilling dust, detrimentally impacts the holding torque, and decreases the latter. At the same time, the concentricity and/or coaxiality of the tool shank and clamping surfaces is negatively influenced by such contamination, which ultimately leads to a diminished drilling quality, a lower position accuracy, an elevated tool wear and an increased risk of tool failure.

Among other things, drilling and milling machines known from prior art are characterized in that the machine tools can automatedly insert and replace tools in the collet chuck, for example in order to replace worn tools or insert tools specifically suitable for the process. The collet chuck is here often opened by a pneumatic actuator, wherein, depending on the type of selected collet chuck, one part of the collet chuck is axially displaced against another part of the collet chuck, so as to enable the removal of the current and reception of the new tool. Deactivating the pneumatic actuator can subsequently eliminate the need for the axial opening force, as a result of which the collet chuck can be closed, for example through exposure to a spring force, and the tool can be clamped or chucked. The spring force can be applied by a spring or a spring pack.

This cycle of opening and closing or clamping takes place several thousand times during the life of a collet chuck, which is accompanied by signs of wear. In addition, deposits and surface welds can negatively affect the functionality of the collet chuck. In order to counteract this, the clamping surfaces of the collet chuck must always be free of deposits, and if possible wetted with a fine lubricating film.

The combined activities required for this purpose to clean and lubricate the collet chuck are usually performed manually by a service technician, and generally referred to as collet chuck maintenance. Collet chuck maintenance takes up a considerable amount of time, and leads to a stoppage of the machine tool, i.e., to an expenditure of time and money. In addition to the expenditure of time and money, the process of collet chuck maintenance is itself controversial. The maintenance jobs include spraying a lubricant into the open collet chuck, as well as cleaning the collet chuck by means of an aggressive chemical cleanser and a brush. This procedure can result in deposits and contamination getting more deeply introduced into the collet chuck, while the chemical cleanser acts on the lubricating film, for example the lubricant film of a spring arranged in the collet chuck. In addition, because maintenance is performed manually, the quality of collet chuck maintenance depends greatly on the person doing the maintenance, which is why in particular there is no reliable repeatability of the maintenance process. Finally, the means used for lubrication and cleaning are classified as harmful to health, thereby in particular resulting in a risk to the health of the person performing the collet chuck maintenance.

SUMMARY

Proceeding from the above, the object of the present invention is to optimize the maintenance process for a collet chuck of a machine tool, thereby avoiding the aforementioned disadvantages. Furthermore, the object of the present invention lies in particular in providing a maintenance process for a collet chuck as well as components of a machine tool required for this purpose, which improve the repeatability of maintenance, and permit an automated collet chuck maintenance.

This object is achieved with a spindle, a collet chuck, a maintenance tool, a machine tool, as well as a method for maintaining a collet chuck as discussed in addition detail below.

An inventive spindle of a machine tool, in particular a machine tool for machining workpieces, has a connecting plate, a shank element that can be displaced in the longitudinal direction of the spindle and is mounted in the connecting plate, as well as a spindle shank that can be rotated in the circumferential direction of the spindle. In addition, the spindle shank has a connecting piece for connecting a connecting element of a collect chuck set up to receive a processing tool or maintenance tool to the spindle. For example, the connecting piece can here be pressed into the spindle shank, or even be designed as a single piece with the latter. The connecting piece preferably has a female thread, so that the connecting element of a collet chuck can be screwed into the connecting piece. The connecting plate is further used for connecting the spindle to a compressed air unit and a lubricant supply of a machine tool. Furthermore, the shank element of the spindle has a through hole in the longitudinal direction of the spindle, wherein the connecting plate has a lubricant inlet for connection to the lubricant supply, and at least one separate compressed air inlet for connection to the compressed air unit. The connecting plate is further set up to fluidically connect the through hole of the shank element to the at least one compressed air inlet as well as the lubricant inlet.

The spindle according to the invention, which preferably extends further in the longitudinal direction than in a radial direction perpendicular thereto, has a simultaneous lubricant and compressed air supply. The spindle is preferably set up to be coupled with the remaining periphery of a machine tool or connected thereto via the connecting plate. Such a machine tool has a drive unit, for example a motor, which preferably can rotate the spindle shank of the spindle relative to the shank element and to the connecting plate. In addition, the spindle shank (rotor) is housed in a stator, which is rotationally fixed relative to the spindle shank. During rotation of the spindle shank, the latter then rotates inside of a stator. In order to ensure the lubricant and compressed air supply, the connecting plate further has an opening for a compressed air inlet as well as an opening for a lubricant inlet. Compressed air can be supplied from a compressed air unit to the machine tool via the compressed air inlet, and lubricant can be supplied from a lubricant supply, for example a lubricant reservoir, to the connecting plate via the lubricant inlet. Furthermore, the connecting plate is set up to supply the compressed air as well as the lubricant to the through hole of the shank element of the spindle, and for this purpose has corresponding through channels, through which the compressed air as well as the lubricant can flow inside of the connecting plate to the through hole of the shank element.

If the spindle is connected to a machine tool, the shank element of the spindle is located on the side of the connecting plate facing away from the machine tool, i.e., on the side of the so-called second lower surface of the connecting plate. The shank element is here preferably non-rotatably mounted in the connecting plate so that it can be displaced in the longitudinal direction of the spindle. Located inside of the shank element is the previously already mentioned through hole, which extends in the longitudinal direction over the entire length of the shank element, and is set up to carry the compressed air supplied to the connecting plate and the lubricant supplied to the connecting plate. The shank element can be longitudinal displaced pneumatically by supplying compressed air through the compressed air inlet. Moreover, the spindle on the side facing away from the machine tool is set up to be connected to a collet chuck, and for this purpose has a connecting piece, for example, as already described previously. In addition, the spindle or the stator of the spindle can be covered at least regionally by a spindle cover on the side lying opposite the connecting plates. The spindle cover is here likewise rotationally fixed relative to the spindle shank, so that the spindle cover does not rotate when the spindle shank rotates. The spindle cover might sometimes have to be loosened, so as to loosen a collet chuck connected to the spindle from the spindle. The collet chuck is preferably connected to the spindle, i.e., to the connecting piece of the spindle, in such a way that rotating the spindle shank of the spindle simultaneously also rotates the collet chuck. During operation of the machine tool, the through hole of the shank element of the spindle is not necessarily continuously supplied with compressed air and lubricant, so that corresponding valves, etc., which can be arranged both in the connecting plate and also the machine tool, regulate a corresponding compressed air and lubricant supply. Such metering valves can here dispense a defined quantity of lubricant at defined times, and in particular be actuated by control air. The lubricant reservoir can here comprise a pressurized container. As a consequence, the spindle according to the invention enables a lubricant and compressed air supply from the machine tool, which would otherwise have to be done manually by a service technician, and would be introduced on the collet chuck side.

In an embodiment, the shank element that carries the compressed air and the lubricant has a multipart, preferably two-part, design, wherein the parts of the shank element can be connected with each other by being screwed together.

In an embodiment, the connecting plate of the spindle has a lubricant line, wherein the lubricant line protrudes into the through hole of the shank element. For example, the lubricant line can here be connected in the form of a capillary tube or a flexible hose to the lubricant inlet of the connecting plate or a through channel bordering the lubricant inlet, so that lubricant can correspondingly be guided from the lubricant supply into the lubricant inlet of the connecting plate and further via the lubricant line into the through hole of the shank element. Part of the lubricant line can here initially run inside of the connecting plate, and subsequently exit the latter and enter into the through hole of the shank element. Moreover, the lubricant line can be connected to a through channel lying inside of the connecting plate. Because the through hole of the shank element is simultaneously connected to the at least one compressed air inlet of the connecting plate, the through hole can both carry the lubricant line coming from the connecting plate, and be set up to carry the compressed air flowing in from the separate compressed air inlet. Furthermore, the lubricant and the compressed air can here also be carried inside of the connecting plate, and possibly also inside of the through hole of the shank element in channels arranged spatially separate from each other, i.e., the lubricant line and the through hole, wherein the lubricant is carried inside of the lubricant line, and wherein the compressed air is carried in the area of the through hole of the shank element surrounding the lubricant line. Regardless of whether the lubricant and the compressed air flow into the through hole or the corresponding channels of the shank element simultaneously or sequentially, i.e., one after the other, a lubricant mist can be generated, or the initially fluid lubricant can be distributed by the compressed air. It is likewise possible to blow out excess lubricant at the end of a maintenance process, or to initially blow out foreign bodies, such as chips and drilling dust, and subsequently introduce lubricants at the beginning of the maintenance process.

In the entire application, the term "through hole" is always to be understood as a continuous channel, i.e., a flow can pass completely through the component provided with a through hole from one end of the through hole to the other end of the through hole, even though the diameter of the through hole or the number of channels of the through hole can change regionally inside of a through hole. For example, the through hole of a two-part shank element set up to carry compressed air can regionally have four individual channels, so that an airflow is split up into four partial airflows.

In another embodiment, the lubricant line has at least one guiding element, wherein the at least one guiding element has recesses and/or regionally abuts against an inner surface of the through hole of the shank element. The guiding element can here be designed in such a way that the lubricant line has a fixed position relative to the radial direction of the through hole. In particular, this enables a more targeted compressed air and lubricant supply into the through hole of the shank element or into a connected collet chuck, provided the lubricant line passes completely through the through hole of the shank element. As a consequence, the at least one guiding element is characterized in that it keeps the lubricant line at a predefined distance to the inner surface of the through hole. The lubricant line optimally has at least two guiding elements, so that it can be kept a uniform distance away from the inner surface of the through hole over the entire length. To prevent the guiding element from blocking the through hole of the shank element and ensure that compressed air can continue to flow through, the guiding element has recesses or only regionally abuts against the inner surface of the through hole. In order to keep the distance between the lubricant line and inner surface of the through hole constant, the guiding element for this purpose has at least three contact points or contact surfaces with the inner surface of the through hole of the shank element.

In another embodiment of the spindle, the shank element of the spindle is arranged so that it can be displaced relative to the lubricant line in a longitudinal direction of the spindle. This means that the shank element can be displaced in relation to the connecting plate in a longitudinal direction, wherein the lubricant line coming out of the connecting plate is axially fixed in place together with the connecting plate. Given a movement of the shank element in the longitudinal direction of the spindle, the shank element is thus axially displaced, wherein the lubricant line inside of the through hole of the shank element is displaced relative to the latter. If the lubricant line has at least one guiding element described above, this guiding element glides along the inner surface of the through hole of the shank element. This guiding element here preferably only regionally has contact surfaces with the inner surface of the through hole of the shank element, so as to reduce the friction between these two components. In order to displace the shank element in a longitudinal direction, an extra drive or an actuator can be provided in the machine tool for this purpose. For example, a pneumatic actuator can be used to displace the shank element via a corresponding airflow relative to the connecting plate of the spindle.

In another embodiment for connection to the compressed air unit, the connecting plate of the spindle thus has at least one additional compressed air inlet, wherein the shank element of the spindle is arranged so that it can be displaced in the longitudinal direction of the spindle by a compressed air supply that takes place via the at least one additional compressed air inlet. As a consequence, the connecting plate has at least two compressed air inlets and at least one lubricant inlet, wherein one compressed air inlet is used to supply compressed air into the through hole of the shank element of the spindle, wherein one compressed air inlet is used to supply compressed air for axially displacing the shank element, and wherein the lubricant inlet is used to supply lubricant into the through hole of the shank element of the spindle. Even if the inlets primarily serve the function described above, the compressed air of the additional compressed air inlet can at least partially flow into the through hole of the shank element. The compressed air flowing into the connecting plate via the at least one additional compressed air inlet preferably acts on a connecting element of the shank element, for example which is arranged in a cylinder bore of the connecting plate, and stores the shank element in the connecting plate so that it can be axially displaced in the longitudinal direction of the spindle. Exposing the connecting element to compressed air makes it possible to displace the shank element.

In an alternative embodiment, the connecting plate of the spindle is discoidal, wherein at least one of the compressed air inlets and/or the lubricant inlet is formed on an outer circumferential surface of the discoidal connecting plate. Accordingly, the discoidal connecting plate has essentially three outer surfaces, a surface directed toward the machine tool, the so-called first upper surface, a surface facing away from the machine tool, the second lower surface already mentioned above, and an outer circumferential surface that forms between these two surfaces.

Alternatively, the object of the present invention is achieved by a collet chuck, wherein the collet chuck is set up for connection to a spindle according to one of the embodiments described above. The collet chuck further has a clamping element intended in particular for clamping a tool, in particular a processing or maintenance tool, and a connecting element set up in particular for connecting the collet chuck to a connecting piece of the spindle. The clamping element is here arranged behind the connecting element in the longitudinal direction of the collet chuck. Moreover, the clamping element and the connecting element each have a through hole, wherein the through hole of the clamping element is set up to receive the tool, and has clamping surfaces. The clamping surfaces of the clamping element are here set up to abut against a tool clamped into the clamping element. In addition, the through hole of the clamping element and the through hole of the connecting element together form a through channel through the collet chuck.

As a consequence, the collet chuck essentially consists of two components, the clamping element and the connecting element. In a state in which the collet chuck is connected to the spindle of a machine tool, the connecting element is thus oriented in the direction of the machine tool. In the longitudinal direction of the collet chuck, the clamping element lies on the side of the collet chuck lying opposite the connecting element. The connecting element here preferably has a thread, which can be screwed with the connecting piece of the spindle. The shank element preferably has a cylindrical section as well as at least one conical section. Furthermore, both the connecting element and the clamping element each have a through hole, wherein the through holes are arranged or the connecting element and the clamping element are arranged in such a way that the through holes together form a through channel, i.e., a complete passage through the entire component of the collet chuck. The through hole of the clamping element further comprises clamping surfaces, which preferably are located on the inner surface of the through hole of the clamping element. The collet chuck is further designed in such a way that the clamping surfaces of the clamping element are set up to clamp a tool for processing a workpiece between these clamping surfaces, wherein the clamping surfaces of the clamping element abut against the tool shank of the tool. As soon as a tool has been clamped between the clamping surfaces of the clamping element and the collet chuck has been connected to the spindle of the machine tool, a rotational motion of the spindle can be transferred to the tool. Therefore, the clamping surfaces generate the holding torque which counteracts a twisting of the clamped tool inside of the through hole of the clamping element. The clamping surfaces of the clamping element are preferably concave in design, wherein the diameter of the through hole preferably diminishes in the area of the clamping element when the clamping element is switched from an open position, in which the tool can be introduced into the clamping element or removed from the latter, into a closed position, in which the tool can be clamped between the clamping surfaces of the clamping element.

For example, a collet chuck according to the invention could be derived by correspondingly modifying the collet chuck model "METODRILL Collet WW-49860".

In another embodiment, the through channel of the collet chuck is set up to establish a flow connection with the through hole of the shank element of the spindle just as soon as the collet chuck is connected to the spindle, for example by being screwed with a connecting piece of the spindle. The collet chuck can be connected to a spindle of a machine tool in particular via the connecting element, thus setting it up to carry compressed air and/or lubricant, and conduct a corresponding medium directly into the through channel of the collet chuck. The advantage to this is that the corresponding medium, i.e., the compressed air and/or the lubricant, can be transported into the collet chuck, and here used for maintenance purposes. Moreover, a constant compressed air flow conducted from the spindle, i.e., the through hole and possibly the lubricant line of the shank element of the spindle, into the collet chuck can ensure that drilling dust, chips, etc. cannot penetrate into the collet chuck, in particular while processing workpieces, and that the collet chuck is protected against the undesired penetration of foreign bodies by means of the compressed air, i.e., sealing air.

In another aspect of the present invention, the connecting element of the collet chuck is at least regionally arranged inside of the clamping element of the collet chuck, wherein the clamping element is arranged so that it can be displaced in the longitudinal direction of the collet chuck relative to the connecting element, in particular against a spring force of a spring arranged between the clamping element and the connecting element. The collet chuck can here be opened and closed by correspondingly displacing the clamping element relative to the connecting element of the collet chuck. A spring, in particular a spring pack, can be arranged between the clamping element and the connecting element, and apply the required restoring force, for example which transfers the collet chuck into the closed position, wherein the connecting element and the clamping element are displaced relative to each other. Opening can then take place via the force transmission of the previously described, in particular pneumatic, displacement of the shank element of the spindle. The connecting element here usually has a smaller outer diameter than the clamping element. The relative displaceability of the clamping element in relation to the connecting element of the collet chuck also allows a displacement of the shank element of the spindle in the longitudinal direction of the spindle to lead to a corresponding relative displacement of the clamping element and the connecting element. As soon as the collet chuck is connected to a spindle of the machine tool, a displacement of the shank element of a spindle can thus be used to open and/or close the collet chuck.

In the abstract, then, the shank element involves an oblong, cylindrical body with a through opening, which, among other things controlled by air, can be axially displaced in the longitudinal direction of the spindle relative to the spindle shank, so as to actuate the collet chuck opening mechanism.

For example, to prevent foreign bodies like drilling dust, chips, lubricant, etc., from being able to undesirably penetrate into an intermediate space between the connecting element and clamping element of a previously described displaceable collet chuck, another embodiment of the collet chuck provides that the through channel of the collet chuck have a sealing element, wherein the sealing element in particular seals an area lying between the connecting element and the clamping element in relation to the through channel. Moreover, the sealing element can also be set up to seal the stop surfaces between the shank element of a spindle and a connecting element of a collet chuck, for example when the clamping element and the connecting element cannot be displaced relative to each other. Furthermore, additional sealing elements can be arranged in particular inside of the through channel of the collet chuck, in particular so as to seal critical opening areas inside of the collet chuck. For example, such critical opening areas could be holes arranged perpendicular to the longitudinal axis of the through channel of the collet chuck, or other areas in which the penetration and pressing in of foreign bodies caused by the compressed air is undesired.

In addition, the object of the present invention is achieved by a maintenance tool. Such a maintenance tool has a rod element with an outer surface and a through hole that runs along the longitudinal axis of the rod element, wherein the through hole of the maintenance tool is set up to form a flow connection with the through channel of the collet chuck as soon as the maintenance tool is arranged in the through channel of the collet chuck. Therefore, the maintenance tool essentially comprises a cylindrical, in particular tubular, component, which can be introduced into the collet chuck. The outer diameter of the maintenance tool is to be determined as a function of the collet chuck with which the maintenance tool is to be used, and is essentially equal to the tool shank diameter of a processing tool which can be used with the collet chuck. This means that the invention also provides a maintenance tool for frequently used collet chucks that are suitable for tool shank diameters of 3.175 mm. A stop is preferably located in the through channel of the collet chuck, so that the maintenance tool can be pushed so far into the collet chuck until the maintenance tool abuts against this stop. Given an automated machine tool, in which the processing tools are automatedly changed, the maintenance tool is usually changed like a processing tool. This means that the maintenance tool is introduced into the collet chuck instead of a processing tool as soon as a corresponding maintenance cycle of the automated machine tool is performed. Consequently, the maintenance tool, just like a processing tool, can be rotated by rotating the collet chuck relative to the shank element of the spindle. Therefore, when the maintenance tool is introduced into the through channel of the collet chuck, the maintenance tool preferably covers the clamping surfaces of the collet chuck, so that a medium flowing into the through channel of the collet chuck, for example compressed air or lubricant, can pass by the clamping surfaces and be blown out through the through hole of the rod element of the maintenance tool. The previously described sealing element of the collet chuck can here be used to introduce the maintenance tool into the sealing element, for example if the sealing element has an annular shape. As soon as the maintenance tool is arranged in the collet chuck, this allows the medium to flow directly into the through hole of the rod element of maintenance tool, and minimizes the danger that the medium will also flow by the maintenance tool. In this way, the clamping surfaces of the collet chuck can be effectively prevented from being wetted with lubricant.

In another embodiment of the maintenance tool, the outer surface of the rod element of the maintenance tool has a sealant, for example a rubber lip, wherein the sealant is set up to seal clamping surfaces of the collet chuck as soon as the maintenance tool is arranged in the through channel of the collet chuck. As a consequence, the rod element can be made out of a body, for example a metallic material, wherein regions on the outer surface of this body have a corresponding sealant. For example, the outer surface, i.e., the sheathing of the rod element, could be partially rubberized, so as to achieve a corresponding sealing effect. Alternatively, the rod element can also be composed of two or more components with varying materials.

In another embodiment, the rod element has a catch tank at one end, or is set up to be introduced into a catch tank, wherein the through hole of the rod element is set up to be fluidically connected with the catch tank. As soon as an inventive collet chuck is connected to an inventive spindle and maintenance is to be performed, the maintenance tool can be introduced into the through channel of the collet chuck. During a maintenance of the collet chuck, which involves in particular the introduction of compressed air and lubricant into the through channel of the collet chuck via the shank element of the spindle, the lubricant and possibly foreign bodies can be blown out of the collet chuck, and collected by the catch tank. This makes it possible to avoid an undesired contamination of machine tool parts or the machine tool environment. In addition, the catch tank can be used to prevent an uncontrolled exiting of lubricant and foreign bodies. In principle, the maintenance tool is introduced into the collet chuck as described previously, similarly to a tool change for processing workpieces, wherein the collet chuck is opened, the maintenance tool is introduced into the collet chuck and clamped. Alternatively, the maintenance tool can also be introduced without first opening the collet chuck, and held in the collet chuck by the sealant, i.e., by the sealing element of the collet chuck and/or by the sealant of the maintenance tool.

In another embodiment, the rod element of the maintenance tool is rotatably mounted relative to the catch tank. For this purpose, the rod element preferably protrudes into the catch tank, wherein the rod element is rotatably mounted on the catch tank. This allows the catch tank to rotate relative to the rod element of the maintenance tool, so that the rod element can be rotated during a maintenance procedure independently of the catch tank, for example. As a result, in particular the rotating masses can be reduced. It is likewise possible that the maintenance tool initially be introduced into the collet chuck, and subsequently attaching the catch tank to the rod element or introducing the maintenance tool into the catch tank. The rotatable mounting between the rod element and catch tank makes it easier to connect additional components, for example to connect hoses, to the catch tank, since the latter does not necessarily rotate as a function of the maintenance tool.

Alternatively and for a case where the maintenance tool is fixedly connected with the catch tank, the maintenance tool together with the catch tank can be accommodated by the collet chuck during the maintenance procedure. This means that the rod element of the maintenance tool is introduced into the collet chuck, wherein the catch tank is fixedly connected to the maintenance tool while introducing the maintenance tool. For example, the connection between the maintenance tool and catch tank can be realized by a detachable snap connection. In this embodiment, the rod element of the maintenance tool is mounted so that it cannot rotate relative to the catch tank. In particular, the fixed connection between the maintenance tool and catch tank ensures that the time required for changing the tool, during which the maintenance tool is introduced into the collet chuck, can be reduced.

In another aspect of the present invention, the catch tank has at least one air-permeable filter fleece. For example, the filter fleece can here form an outer wall of the catch tank, or otherwise be arranged inside of the catch tank. The filter fleece here preferably serves to filter lubricant from the compressed air, thereby making it possible to prevent the distribution of lubricant mist outside of the machine tool. The filter fleece is preferably designed in such a way that the filter fleece can be easily changed out as soon as it no longer adequately filters the compressed air In addition, the object of the present invention is also achieved by a processing station of a machine tool, wherein the processing station has a spindle according to the preceding description, a collet chuck according to the preceding description connected to the spindle, a machine tool according to the preceding description, a compressed air unit connected to a compressed air inlet and a lubricant supply connected to the lubricant inlet of the spindle. Moreover, the processing station comprises a drive unit, which is set up to rotate the spindle, and a control unit. The control unit of the processing station is here set up to control the processing station in at least two operating modes. A first operating mode of these two operating modes can serve to process workpieces, for example, wherein a second operating mode can serve to maintain the processing station, for example. If the processing station is actuated so as to be operated in the first operating mode, the compressed air unit of the spindle supplies compressed air to a first pressure stage, in particular for blowing out foreign bodies. If the processing station is operated in the second operating mode, in which the maintenance tool is introduced into the through channel of the collet chuck, the compressed air unit and the lubricant supply of the spindle sequentially or simultaneously supply lubricant and compressed air in at least one second pressure stage.

Among other things, a processing station is characterized in that the processing station has a spindle. Moreover, a machine tool is characterized in that it has at least one processing station. However, modern machine tools often have several such processing stations. In an ideal case, each processing station is then equipped according to the invention. In the event that a machine tool has several processing stations, it can be advantageous to provide only one central control unit or a central lubricant reservoir in the machine tool, for example, so that the processing stations can be centrally actuated and supplied with corresponding media (compressed air, lubricant). Various valves, pressure reducers, control elements, pumps, a pressurized container, etc., can be used to enable, control, and regulate the supply of lubricant and compressed air. These components thus form part of the infrastructure, and are required for the compressed air and lubricant flows.

In the first operating mode of the operating station, the processing station can be set up to process a workpiece with a processing tool. For this purpose, a tool, for example a drill, is initially clamped into the processing station, and the processing station is subsequently actuated in the first operating mode via the control unit. The collet chuck into which the tool is clamped and the spindle shank of the spindle of the processing station to which the collet chuck is connected then rotate as a function of the rotation of the spindle shank. The clamping surfaces of the collet chuck here fix the processing tool in place. In the first operating mode, the compressed air unit supplies compressed air as already described above, in particular via the through hole of the shank element of the spindle and the through channel of the collet chuck, wherein a continuous supply of compressed air prevents foreign bodies from penetrating into the collet chuck during the processing of workpieces, for example. Moreover, the compressed air can be used to blow out foreign bodies, wherein the blowing out process especially preferably takes place as soon as the tool was removed from the collet chuck. Consequently, the compressed air supply can take place continuously or also with interruptions in the first operating mode, wherein, with regard to the compressed air and the lubricant, the first operating mode is characterized in particular in that only compressed air is supplied to the collet chuck in this operating mode. Moreover, the first operating mode is characterized in that, during operation, a maintenance tool is clamped into the collet chuck, and not a tool for processing.

By contrast, both lubricant and compressed air are simultaneously or sequentially supplied to the collet chuck via the lubricant supply and the compressed air unit in the second operating mode. This supply can also take place continuously, or with some interruptions. If the lubricant is simultaneously supplied together with the compressed air, a lubricant mist forms, which is especially well suited for distributing the lubricant inside of the collet chuck. Moreover, this causes the lubricant to also be especially well distributed in the contact area between the collet chuck and spindle. Alternatively, compressed air or lubricant can initially be supplied, wherein the lubricant can subsequently be distributed via the supplied compressed air, for example. To prevent the clamping surfaces of the collet chuck from becoming contaminated and wetted with lubricant in the second operating mode, a maintenance tool is introduced into the collet chuck in this operating mode. As a result, the through channel of the collet chuck can be lengthened by the cylindrical and tubular maintenance tool, and the lubricant mist or the lubricant and the compressed air can be run by the clamping surfaces of the collet chuck and led out of the collet chuck. As described above, the maintenance tool can also have sealant, and thereby additionally seal the clamping surfaces against contamination. In addition, it is especially preferred that compressed air be supplied to the collet chuck at the end of operating the processing station in a second operating mode, so as to thereby prevent lubricant from later dripping out of the collet chuck. Only after this is the maintenance tool removed from the collet chuck.

In another embodiment, the shank element of the spindle is displaced in the longitudinal direction of the shank element of the spindle in the second operating mode, as a result of which the connecting element of the collet chuck connected to the spindle is displaced relative to the clamping element of the collet chuck in the longitudinal direction of the shank element. The displacement of the shank element and the displacement of the connecting element preferably serve to open or close the collet chuck. In particular, this makes an intermediate space lying between the clamping element and the connecting element especially readily accessible, and lubricant can thereby become especially well distributed. Furthermore, this allows the contaminants that accumulated in the intermediate space to be dissolved and blown out by the compressed air. As already mentioned above, displacement of the connecting element relative to the clamping element can be performed against a spring force.

In an alternative embodiment, the spindle shank of the spindle rotates with changing rotational speeds in the second operating mode, as a result of which the collet chuck of the processing station connected to the spindle shank rotates with varying rotational speeds. The change in rotational speed of the spindle shank, i.e., the performance of a so-called spin up of the collet chuck connected to the spindle shank, serves in particular to distribute the lubricant inside of the collet chuck assisted by centrifugal force. To this end, for example, lubricant can initially be introduced into the collet chuck, the collet chuck can be spun up via the spindle shank, and the excess lubricant can then be blown out.

In another embodiment of the processing station, the control unit acquires at least one of the following pieces of information:

The time at which the processing station is operated in the second operating mode;

The number and/or the duration of operation of the processing station in the second operating mode;

The supplied quantity of lubricant during the operation of the processing station in the second operating mode.

For this purpose, the machine tool can have a suitable sensor array, for example for measuring the fill level of a lubricant reservoir of the processing station, so that the supplied quantity of lubricant can be determined during operation in the second operating mode. A predetermined quantity of lubricant is preferably defined or provided for performing a maintenance on the collet chuck, which allows the control unit to discontinue the lubricant supply as soon as this quantity of lubricant has been reached. Furthermore, for example, the fill level measurement can inform the user that the lubricant in the lubricant reservoir has to be refilled. Likewise, the information about the time at which the processing station is operated in the second operating mode can be used to determine the time intervals in which the processing station was maintained. Here as well, exceeding a predetermined duration can inform a user of the processing station that the processing station should be maintained. Information about the number or duration of operation of the processing station in the second operating mode can be similarly determined, wherein the duration of maintenance can provide information in particular about the thoroughness of the performed maintenance or about the type of maintenance, if a smaller, shorter maintenance and an extensive, longer maintenance can be performed with the help of the processing station and by correspondingly actuating the control unit. Moreover, the determined information can also be used to ascertain whether a filter fleece of a catch tank of a maintenance tool should be changed.

The object of the present invention is further achieved by a method for maintaining a collet chuck of a processing station described above. The method for maintaining the collet chuck here comprises the following steps:

Checking whether a through channel of a previously described collet chuck has a tool for processing workpieces;

Bringing out the tool, if present;

Introducing a previously described maintenance tool into the through channel of the collet chuck;

Supplying compressed air and/or lubricant via a through hole of a shank element of a previously described spindle of the processing station into the collet chuck; and Removing the maintenance tool from the through channel of the collet chuck.

In order to implement the method, a check is first performed to see whether the through channel of the collet chuck has a tool for processing workpieces, for example a drill. This step is necessary, since the method for maintaining the processing station should be implemented in the previously described second operating mode of the processing station, in which no workpiece for processing workpieces is clamped in the collet chuck. Therefore, if a tool for processing workpieces is arranged inside of the collet chuck, it is first removed from the collet chuck. In principle, the steps can always be performed fully automated by the processing station, but also partially automated or manually. As soon as a tool for processing workpieces is no longer located in the collet chuck, a maintenance tool can be introduced into the through channel of the collet chuck. The maintenance tool is here in particular set up to protect the clamping surfaces of the collet chuck against contamination during maintenance. As soon as the maintenance tool, i.e., possibly also a maintenance tool with catch tank, was introduced into the collet chuck, lubricant and/or compressed air supply can begin. As already described above, lubricant and compressed air supply takes place via the inlets of the connecting plate of the spindle and the through hole of the shank element of the spindle into the through channel of the collet chuck. Because the maintenance tool in principle lengthens the through channel of the collet chuck, the compressed air and the lubricant are also supplied to the through hole of the maintenance tool. The lubricant mist and the lubricant which gets distributed inside of the collet chuck by the compressed air during this step serves to lubricate the collet chuck, wherein contaminants can be removed from the collet chuck in particular by the compressed air.

In another embodiment, the method for maintaining the collet chuck additionally comprises one of the following steps:

Displacing the shank element of the spindle of the machine tool in the longitudinal direction of the shank element;

Rotating the spindle shank of the spindle with a changing rotational speed;

Determining the time at which the method is implemented;

Determining the implementation of the method;

Determining the duration of the method;

Determining the supplied lubricant quantity.

These additional steps can be performed during maintenance of the collet chuck, and serve the purposes and advantages already enumerated above in the description.

BRIEF DESCRIPTION OF THE DRAWINGS

The invention will be described in more detail below based on exemplary embodiments and drawings. All described and/or graphically illustrated features here constitute the subject matter of the invention, whether taken separately or in any combination, regardless of how they are summarized in the claims or referenced.

Schematically shown on.

DETAILED DESCRIPTION

Exemplary embodiments of the present disclosure will be described in detail with reference to the accompanying drawings.

Figure 7:
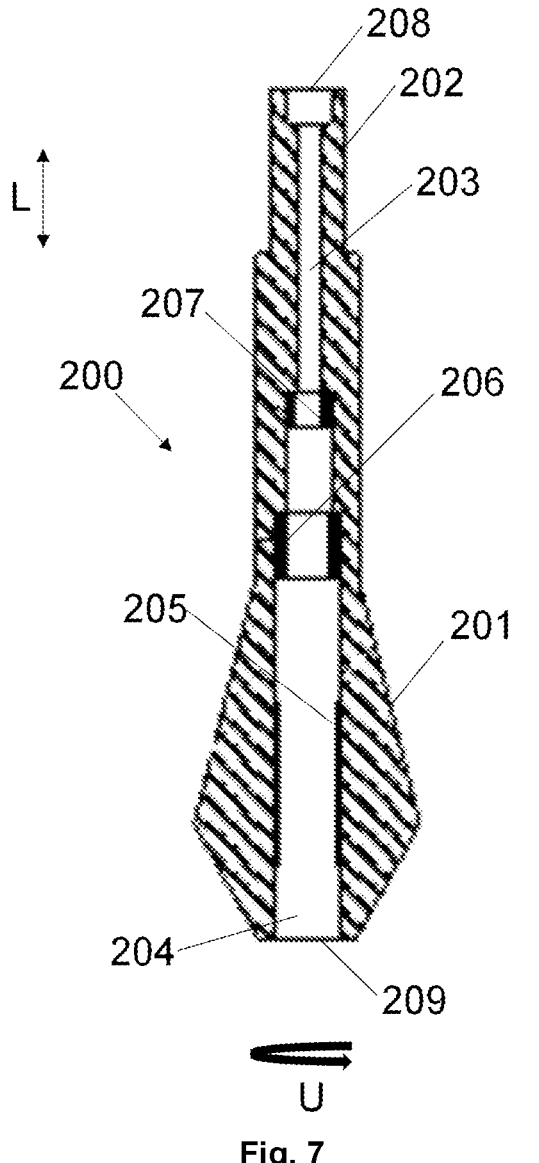
FIG. 7 is a side, sectional view of a collet chuck according to the invention.
Figures 8A, 8B:
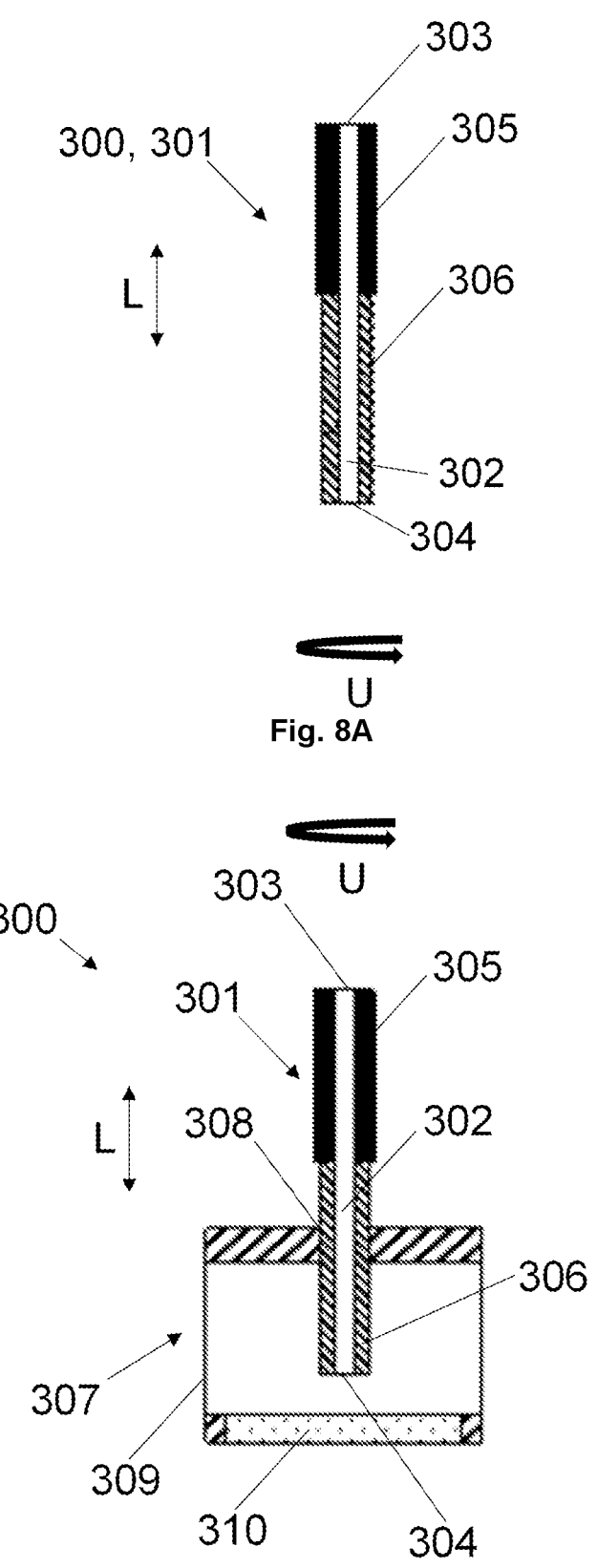
FIG. 8A is a side, sectional view of a first embodiment of a maintenance tool according to the invention.
FIG. 8B is a side, sectional view of a second embodiment of a maintenance tool according to the invention with catch tank.
Figure 8C:
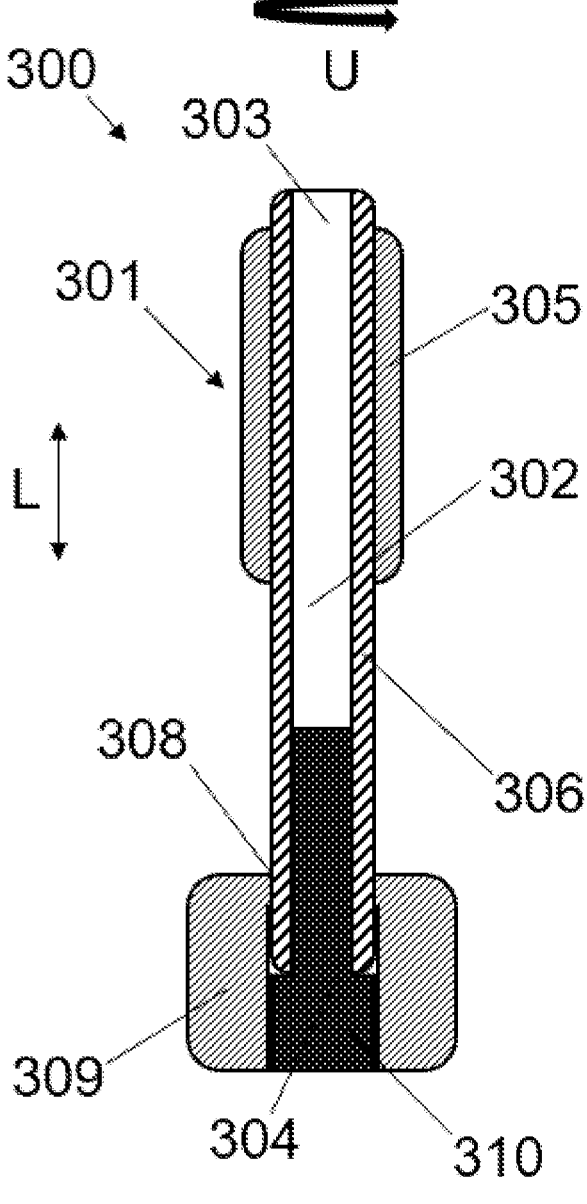
FIG. 8C is a side, sectional view of another embodiment of a maintenance tool according to the invention with catch tank.

The FIGS. 1 to 8C described below sequentially depict a spindle with connected collet chuck (FIG. 1), the components of a spindle in detail (FIGS. 2 to 6B), a collet chuck 200 (FIG. 7), and three embodiments of a maintenance tool 300 (FIGS. 8A and 8C).

Further, an arrow L in all figures points in the longitudinal direction of the respective inventive component of a machine tool or a processing station, i.e., in the longitudinal direction of the spindle, in the longitudinal direction of the collet chuck or in the longitudinal direction of the maintenance tool. Moreover, an arrow U points in the circumferential direction, wherein the circumferential direction is synonymous with the rotational direction of a collet chuck and a tool clamped herein, if the collet chuck is connected according to the invention to the spindle shank of the spindle of a processing station.

A spindle 1 according to the invention comprises a preferably disk-shaped connecting plate 100 with a first upper surface 101, which is set up to be connected to a processing station of a machine tool. Moreover, the spindle 1 shown on FIG. 1 comprises an actuator element 126 as well as a stator 122, which is arranged rotationally fixed around a spindle shank 121. The side of the spindle shank 121 facing away from the connecting plate 100 has a connecting piece 124, which is set up to connect a collet chuck 200 to the spindle 1. While a workpiece is being processed, a processing tool is clamped into the collet chuck 200. The spindle shank 121 arranged inside of the stator 122 subsequently rotates in the circumferential direction U, as a result of which the collet chuck 200 rotates, and thus also the workpiece. In order to be able to secure the spindle shank 121 in the stator 122 against falling out, the spindle 1 has a spindle cover 123 on the side facing the connecting plate.

The interior of the spindle shank 121 has a recess 125, in which a shank element 110 is arranged. The actuator element 126 is set up to induce an axial displacement of the shank element 110. To this end, a pneumatic actuator element has undepicted pressure chambers and seals, so as to axially displace the shank element 110 controlled by air. The shank element 110 is mounted on the one end side in the connecting plate 100 so that it can be axially displaced in the longitudinal direction L of the spindle, and bumps up against the collet chuck 200 on the opposing end side. The interior of the shank element 110 has a through hole 113, in which a lubricant line 108 is arranged. The through hole 113 can be supplied with compressed air from a compressed air unit via a compressed air inlet 104, and the lubricant line 108 can be supplied with lubricant from a lubricant reservoir via a lubricant inlet 105. The lubricant line 108, in particular a capillary tube, can be guided in the through hole 113 of the shank element 110 with the help of guide elements 117.

In order to open the collet chuck 200, the shank element 110 is displaced in the longitudinal direction, and thereby displaces a connecting element 202 relative to the clamping element 201 against the force of a spring pack 210. In the opened state, a tool can be introduced into the collet chuck 200 or removed from it. In particular with the help of the spring force of the spring pack 210, the collet chuck 200 can subsequently be reset, and thereby switched into a closed state. While processing a workpiece or while maintaining the collet chuck 200, the connecting plate 100 can always be used to carry compressed air or lubricant via the corresponding channels (compressed air inlet 104, lubricant inlet 105, through channel 107, lubricant line 108, through hole 113, through channel 203, 204).

Figure 1:
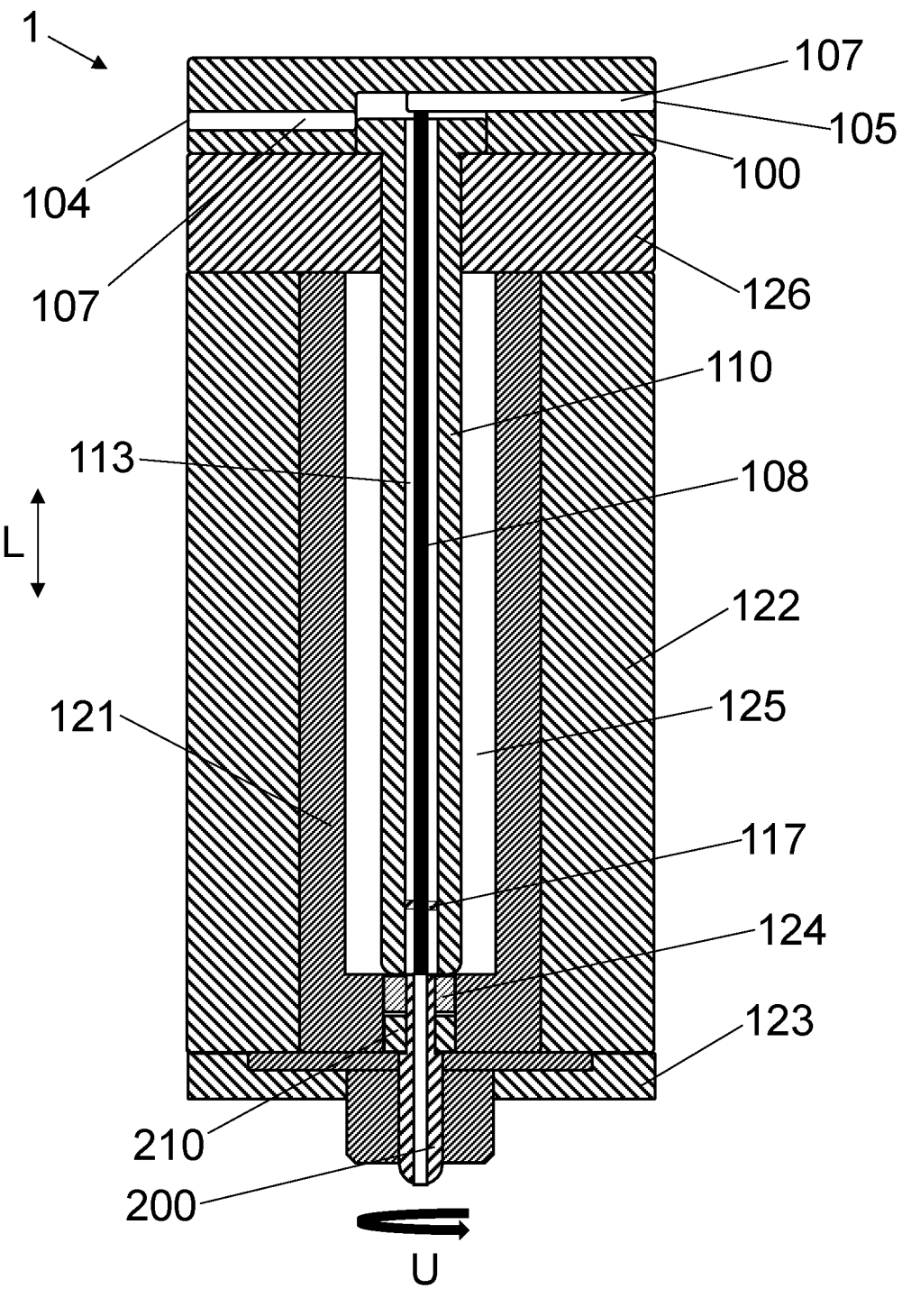
FIG. 1 is a side, sectional view of an embodiment of a spindle according to the invention with connected collet chuck according to the invention.
Figure 2:
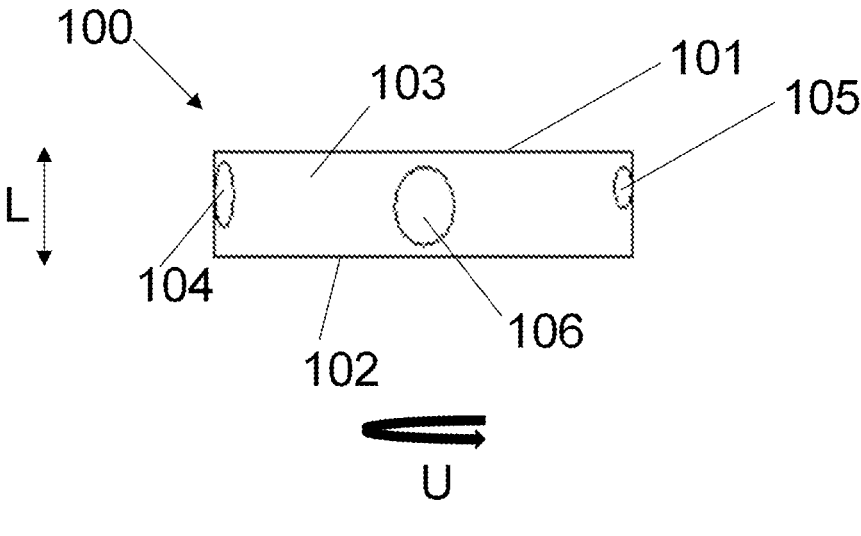
FIG. 2 is a side view of a connecting plate of a spindle according to the invention.
Figure 3:
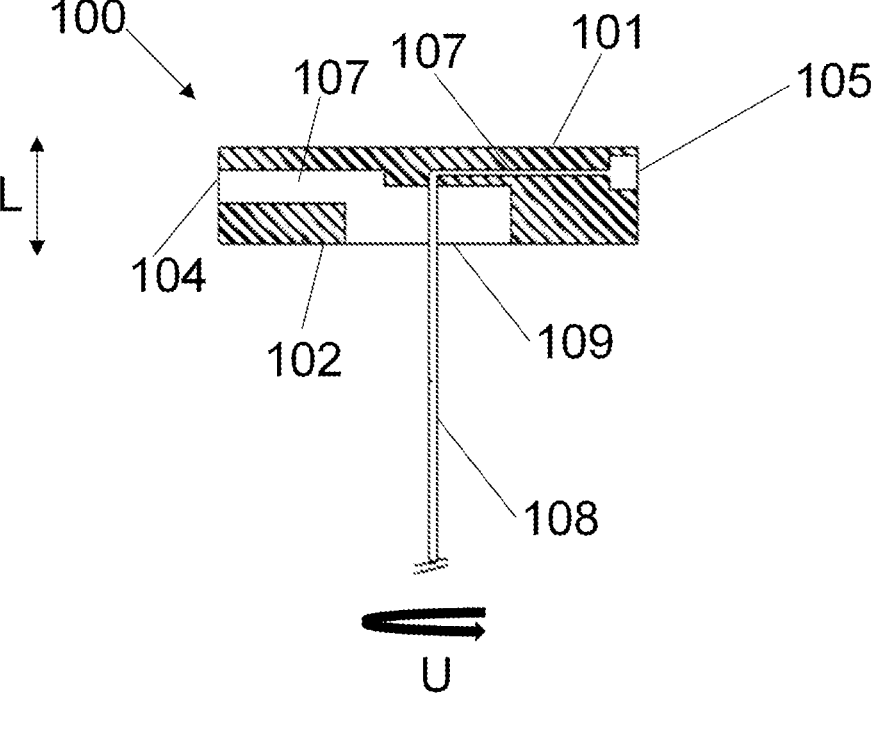
FIG. 3 is a side, sectional view of a connecting plate of a spindle according to the invention with lubricant line.
Figure 4A:
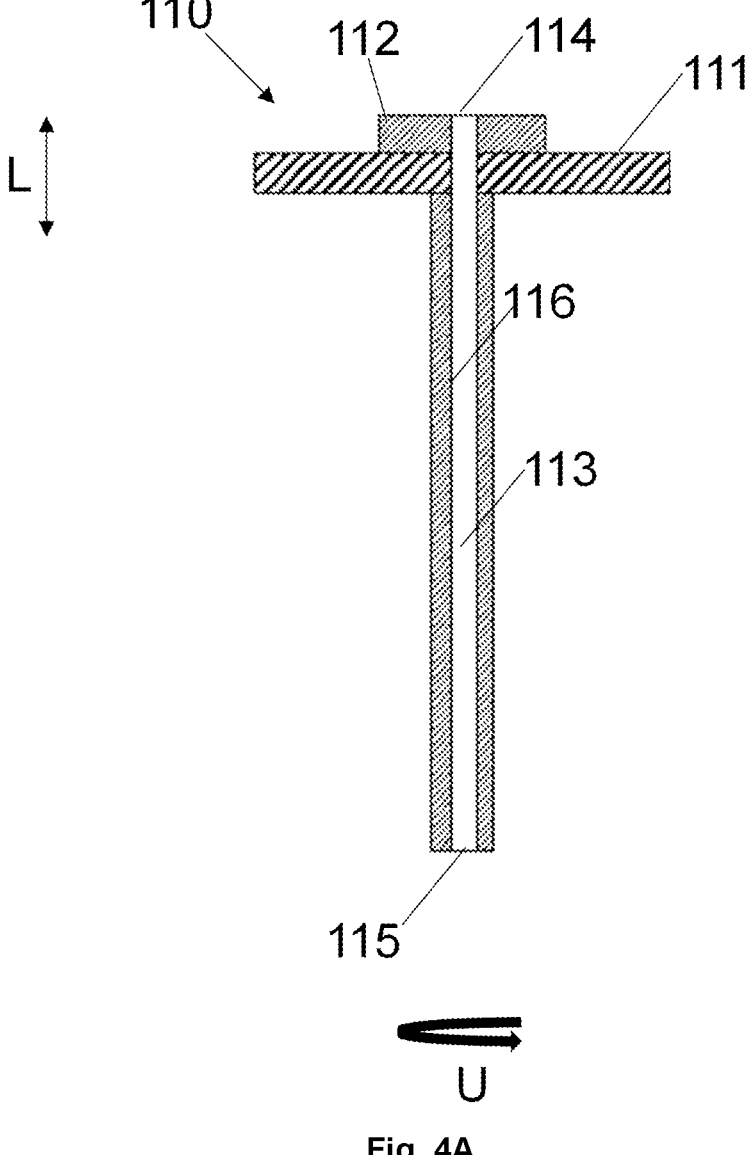
FIG. 4A is a side, sectional view of a first embodiment of a shank element of a spindle according to the invention.
Figure 4B:
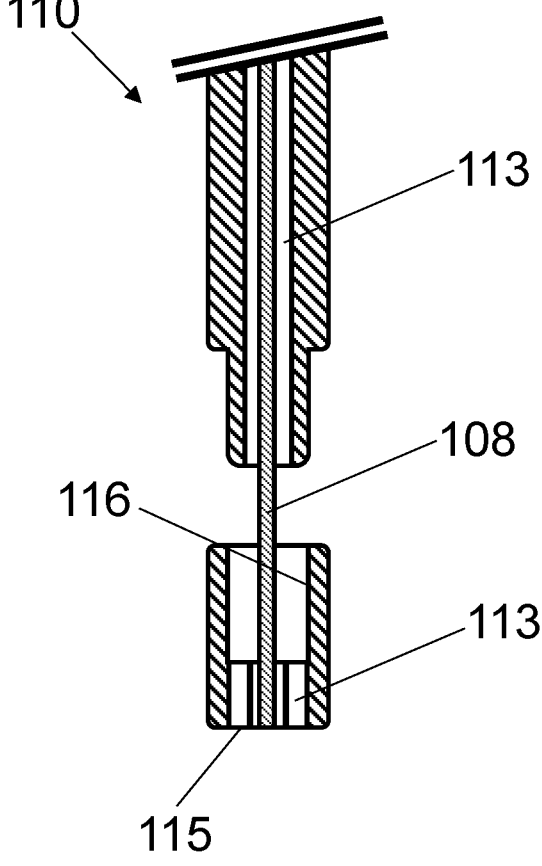
FIG. 4B is a side, sectional view of an alternative embodiment of a shank element of a spindle according to the invention.

The connecting plate 100 shown on FIG. 2 and in an alternative configuration on FIG. 3 has a second lower surface 102, which is oriented in the direction of a shank element 110 of a spindle 1 depicted on FIG. 4A and FIG. 4B. In a state where a collet chuck 200 is connected to the spindle 1, the lower surface 102 thus points in the direction of this collet chuck 200. The side view of the disk-shaped connecting plate 100 on FIG. 2 here shows a circumferential surface 103 of the connecting plate 100 especially well, so that the compressed air inlet 104 arranged on the circumferential surface 103, the lubricant inlet 105 and another compressed air inlet 106 become especially well visible.

In the case of a pneumatic actuator element 126, the pressure chambers of this actuator element can be filled with compressed air via the compressed air inlet 106. As a result, the inner structure of the actuator element consisting of several chambers can be moved together with the beveled shank element 110 relative to the outer shell of the actuator element 126, and thus induce an axial displacement of the shank element.

In an exemplary embodiment of the connecting plate 100 according to FIG. 3, the lubricant inlet 105 can be connected to a lubricant line 108 via a through channel 107. On the shank element side, the lubricant line 108 protrudes from a cylinder bore 109 of the connecting plate 100. On the machine tool or processing station side, the lubricant inlet 105 of the connecting plate 100 can be connected to a lubricant supply, so that lubricant can flow out of a lubricant reservoir of the machine tool into the lubricant inlet 105. The compressed air inlet 104 is connected to a compressed air unit on the machine tool side, and thus set up to allow compressed air flowing from the machine tool to flow into the connecting plate 100. If the connecting plate 100 has no lubricant line 108, the compressed air from the compressed air inlet 104 and the lubricant from the lubricant inlet 105 flows in the direction of the cylinder bore 109 of the connecting plate 100, and possibly accumulates here. The compressed air inlet 104 and the lubricant inlet 105 are here used in particular to supply compressed air and lubricant for maintaining the collet chuck 200, wherein the compressed air inlet 106 is used in particular for pneumatically activating or displacing the shank element 110 of the spindle 1 mounted in an axially displaceable manner in the connecting plate 100.

As shown on FIG. 4A, the shank element 110 can to this end abut with a stop 111 against the first lower surfaces 102 of the connecting plate 100 in a first position, wherein a connecting element 112 of the shank element 110 is arranged inside of the cylinder bore 109 of the connecting plate 100. In this position of the shank element 110, the collet chuck 200 is closed. As soon as compressed air flows into the connecting plate 100 via the compressed air inlet 106 and exposes the connecting element 112 of the shank element 110 to compressed air, the shank element 110 is displaced in a longitudinal direction of the shank element away from the connecting plate 100. This movement of the shank element can be transferred to a connecting element 202 of a corresponding collet chuck 200 and open the latter. If the collet chuck 200 has a spring or a spring pack 210 for the restoring force, the connecting element 202 of the collet chuck 200 is then displaced automatically as soon as the compressed air abates, thereby closing the collet chuck 200.

Figure 4C:
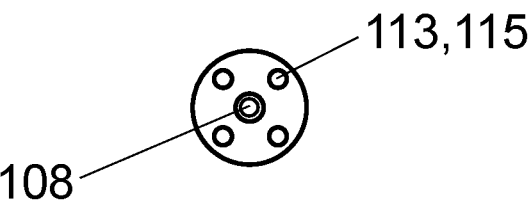
FIG. 4C is a top view of the side of the collet chuck-side outlet of the shank element according to FIG. 4B.
Figure 5:
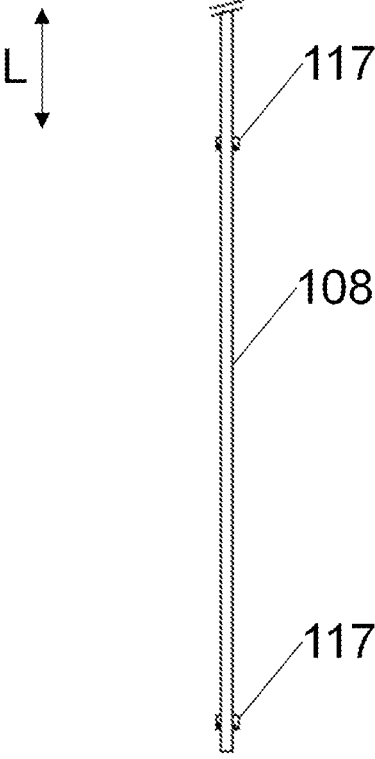
FIG. 5 is a side, sectional view of a lubricant lien with guide elements.

FIG. 4B shows an alternative configuration of a shank element 110, which consists of two parts that can be connected with each other using conventional connection techniques. In the area of the collet chuck-side outlet 115, the through hole 113 is divided into five passages, which together form the through hole of the shank element. The embodiment shown on FIG. 4C shows that a lubricant line 108 runs in the central through hole, wherein four additional through holes are arranged around this central through hole. Consequently, a compressed air flow that flows from the connecting plate-side inlet 113 in the direction of the collet chuck-side outlet 115 is divided into four partial air flows in the area of the collet chuck-side outlet 115. In this embodiment, the guiding function for the lubricant line 108 is ensured by the reduced diameter of the through hole in which the lubricant line 108 is guided in the area of the collet chuck-side outlet 115. For example, if the shank element 110 according to the embodiment on FIGS. 4B and 4C is displaced in the longitudinal direction L of the shank element away from the connecting plate 100, this can take place pneumatically by exposing the surface of the shank element to pressure in the area of the connecting plate-side inlet 114 (not shown on FIG. 4B, since FIG. 4B shows only sections of a shank element, wherein the part in the direction of the connecting plate-side inlet was omitted).

In order to supply the collet chuck with compressed air and lubricant, the compressed air can thus flow via the compressed air inlets 104, 106, the through channels 107 and the cylinder bore 109 into a through hole 113 running in a longitudinal direction of the shank element 110 via a connecting plate-side inlet 114 in the direction of a collet chuck-side outlet 115. Regardless of whether the lubricant is likewise suppled to the cylinder bore 109 via a through channel 107 or carried directly into the through hole 113 of the shank element 110 via a lubricant line 108, the lubricant can also flow in the direction of the collet chuck-side outlet 115 of the through hole 113 via the connecting plate-side inlet 114.

If the spindle according to the invention has a lubricant line 108, the latter can be abutted and supported against an inner surface 116 of the through hole 113 via guide elements 117 (see FIGS. 1, 5, 6A and 6B). Alternatively, the lubricant line 108 can be guided as described previously and shown on FIGS. 4B and 4C. If the shank element 110 of the spindle is displaced in the longitudinal direction, the at least one guide element 117 glides along the inner surface 116 of the through hole 113, or the guide element 117 glides along the lubricant line 108. In the alternative embodiment according to FIGS. 4B and 4C, the lubricant line 108 glides along the area with a reduced diameter of the through hole 113.

Figure 6A:
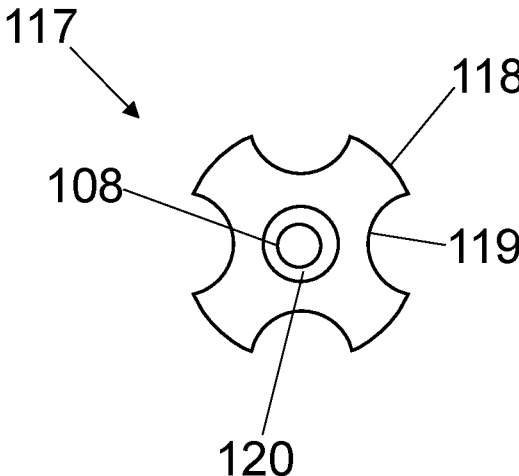
FIG. 6A is a top view of a first embodiment of a guide element of a lubricant line.
Figure 6B:
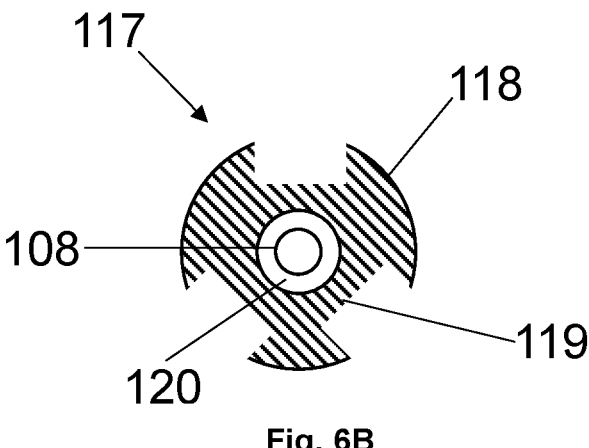
FIG. 6B is a top view of an alternative embodiment of a guide element of a lubricant line.

In order for the guide elements 117 arranged inside of the through hole 113 not to block the through hole 113 and to allow compressed air and/or lubricant to pass, the guide elements have the shape depicted on FIG. 6A or FIG. 6B, for example, wherein only contact surfaces 118 of the guide elements 117 abut against the inner surface 116 of the through opening 113 of the shank element 110. Arranged between the contact surfaces 118 of the guide element 117 are recesses 119, at which the guide element does not abut against the inner surface 116 of the through hole 113, so that the compressed air flowing in through the connecting plate-side inlet 114 can flow past the guide elements 117 with the help of the recesses 119 and possibly an opening 120. As an alternative to the embodiments shown on FIGS. 6A and 6B, the guide element can also be designed in the form of a circular ring, and have corresponding recesses through which the compressed air can flow. In this case, the guide element would completely abut against the inner surface 116 of the through hole 113. Moreover, the guide element 117 has an opening 120 for a lubricant line 108, so that the guide element 117 can be put over the lubricant line 108, wherein the lubricant line need not necessarily abut against the opening 120. For example, the guide elements 117 can also be immovably fixed in relation to the shank element 110, and displaced with the shank element 110 axially relative to the lubricant line 108. By way of the lubricant line 108, the lubricant gets directly into the interior of the through hole 113 of the shank element 110, or directly into a through channel of the collet chuck 200, and is here moved in the direction of the collet chuck 200 with the help of an air flow and/or by gravitational force.

The collet chuck 200 comprises a clamping element 201 and a connecting element 202, wherein the clamping element 201 shown on FIG. 7 and the connecting element 202 are fixedly connected with each other. Both the clamping element 201 and the connecting element 202 each have a through hole 203, 204. The through holes 203, 204 together form a through channel, so that in particular compressed air and/or lubricant flowing into the collet chuck 200 can flow completely through the collet chuck 200. Located inside of the through hole 204 of the collet chuck 200 are clamping surfaces 205, which are set up to clamp a tool, in particular a tool for processing workpieces. Furthermore, a sealing element 206 is arranged in the clamping element 201. The sealing element 206 is used in particular given a displaceable collet chuck, i.e., given a collet chuck in which the clamping element 201 is arranged so that it can be displaced in relation to the connecting element 202 in the longitudinal direction L of the collet chuck 200, for the purpose of sealing an intermediate space between the connecting element 202 and the clamping element 201. Furthermore, a maintenance tool not shown here can be introduced into the through hole 204 of the clamping element 201, and in particular be placed in the sealing element 206, so that the through hole 203 can be connected directly to a through hole 302 shown on FIGS. 8A to 8C in the upper area of the collet chuck 200. The collet chuck further 200 has a drilled sleeve 207. Instead of the threaded sleeve, conventional collet chucks often have grub screws, which prevent a transfer of compressed air and lubricant from an upper area (see through hole 203) of the collet chuck to the lower area (see through hole 204) of the collet chuck by blocking the through channel shown here.

As soon as the collet chuck 200 has been connected to the spindle, the compressed air as well as the lubricant can flow out the collet chuck-side outlet 115 via the through hole 113 of the shank element 110 and into a spindle-side inlet 208 of the collet chuck 200, and flow out of an outlet 209 of the collet chuck 200.

During maintenance, i.e., while the machine tool or processing station is being actuated in a second operating mode, a maintenance tool 300 according to FIGS. 8A to 8C can be introduced into the through hole 204 of the collet chuck 200. Such a maintenance tool 300 comprises a rod element 301, and is essentially set up to route the lubricant and the compressed air along with any other foreign bodies present past the clamping surfaces 205 of the collet chuck 200. The rod element 301 has a tubular body with a through hole 302, wherein the lubricant and the compressed air flow in through the collet chuck-side inlet 303 and flow out through the outlet 304. The depicted rod elements 301 comprise a sealant 305 on the collet chuck side, which, as soon as the maintenance tool 300 has been introduced into the collet chuck 200, is set up in particular to seal the clamping surfaces 205 of the collet chuck 200. An outlet-side rod element 306 is located on the side opposite the sealant 305. The outlet-side rod element 306 preferably has a metallic material, which in particular can extend over the entire length of the rod element 301, and can be provided with a sealant 305 only on the outer surface (see FIG. 8C). If the maintenance tool 300 is clamped in a collet chuck 200, the sealant 305 preferably seal the clamping surfaces 205, so that they are not wetted with lubricant.

Depending on the design of the maintenance tool 300, the outlet 304 can also empty into a catch tank 307, in which the maintenance tool 300 is mounted, wherein the catch tank 307 is connected to the maintenance tool (see FIGS. 8B and 8C). Alternatively, the maintenance tool 300 is initially introduced and clamped in the collet chuck 200, and subsequently introduced into a catch tank 307, wherein the maintenance tool 300 can rotate relative to the catch tank 307 (see FIG. 8A). Regardless of whether the catch tank 307 is already connected with the maintenance tool 300 during the use of a maintenance tool 300 or only connected with the later during maintenance, the catch tank 307 has a bearing 308 that defines the interface between the maintenance tool 300 and the catch tank 307. Depending on the selected bearing 308, the rod element 301 can thus rotate relative to the catch tank 307, or even only rotate together with the catch tank 307.

The catch tank 307 shown on FIG. 8B has a box shape with side walls 309, wherein one of the side walls 309 comprises a filter fleece 310. The maintenance tool 300 according to FIG. 8C also exhibits a catch tank 307 with a filter fleece 310. As soon as the maintenance tool 300 is introduced into a collet chuck 200 for maintenance, the rod element 301 can be rotated dependently or independently of the catch tank 307. The compressed air flowing out of the maintenance tool 300, including the lubricant particles and possible foreign bodies, is collected in the catch tank 307, wherein the filter fleece 310 can be used to filter the lubricant out of the compressed air flowing through the filter fleece 310. The filter fleece 310 is preferably designed in such a way that it can be changed and replaced by a new filter fleece in the catch tank 307.

During the operation of a machine tool or a processing station, in particular during the operation of a fully automated machine tool with at least one processing station and with a control unit, the control unit can actuate the processing station in two operating modes. While the processing station is operating in the first operating mode, in which the processing station is set up to process a workpiece, the spindle is connected to the processing station, wherein the collet chuck 200 is connected to the spindle, and holds a tool for processing, for example a drill, between the clamping surfaces 205 of the clamping element 201 of a collet chuck 200. As soon as a drive unit, for example a motor, rotates the spindle or the spindle shank 121, the collet chuck 200 also rotates, and thus so too does the tool for processing the workpiece. During operation in the first operating mode, compressed air of a compressed air unit can flow into the spindle or the shank element 110 via a compressed air inlet 104 of a connecting plate 100 of the spindle 1, and from here flow into the collet chuck 200 via a through hole 113 of the shank element 110. In particular, the air flow can here serve as seal air, so that it protects the through channel of the collet chuck against the undesired entry of foreign bodies. If the processing station is now operated in the second operating mode for maintaining the collet chuck, the compressed air of the compressed air unit can flow into another compressed air inlet 106, and displace the shank element 110 of the spindle in a longitudinal direction of the spindle.

If the connecting element 202 is arranged so that it can be displaced relative to the clamping element of the collet chuck 200 in a longitudinal direction of the collet chuck 200, this relative movement can be used to open the collet chuck, widen the clamping surfaces 205 and release the clamped tool. A maintenance tool 300 can subsequently be introduced into the through hole 204, and the spindle can be supplied with compressed air via the compressed air inlet 104 and with lubricant via the lubricant inlet 105. As soon as the maintenance tool is arranged inside of the through hole 204, the clamping surfaces 205 are sealed. The clamping surfaces 205 of the collet chuck are thus protected against contaminants, so that the oil-air mixture can now enter into the collet chuck through the through hole 113 of the shank element 110 via the spindle shank-side inlet 208 of the collet chuck 200, become distributed here, and exit again through the through hole 302 of the maintenance tool 300. While the compressed air unit and the lubricant supply of the machine tool are being used to introduce lubricant and compressed air into the collet chuck and to clean and lubricate the collet chuck, i.e., maintain it, the collet chuck 200 connected to the spindle 1 can additionally be rotated, thereby distributing the lubricant assisted by centrifugal force. The collet chuck 200 can likewise be opened and closed with the help of the previously described motion of the rod element 110 in the longitudinal direction of the spindle 1, making it possible to additionally support lubricant distribution. The maintenance tool 300 is then preferably secured against falling out with the sealant 305 in the sealing element 206. Alternatively, the collet chuck can only be opened or closed once the maintenance tool 300 has been removed from the collet chuck, wherein the maintenance tool 300 is previously held in the collet chuck 200 with the help of the clamping surfaces 205. During maintenance, the maintenance tool 300 thus carries the compressed air flow directly past the clamping surfaces 205, and filters the compressed air flow, possibly with the help of a filter fleece 310 arranged in a catch tank 307.

As a consequence, the present invention enables a fully automated maintenance of a machine tool, which in particular involves the introduction of compressed air and lubricant into a collet chuck of a spindle. Moreover, the structure of the spindle, collet chuck and maintenance tool also allows a targeted, partially automated maintenance, for example in which the maintenance tool is manually inserted into the collet chuck, and the lubricant and compressed air are automatedly supplied.

We claim:

1. A spindle of a machine tool for machining workpieces, comprising:
   a connecting plate for connecting the spindle to a compressed air unit and for connecting the spindle to a lubricant supply of the machine tool;
   a shank element that is configured to be displaced in the longitudinal direction (L) of the spindle and that is non-rotatably mounted in the connecting plate of the spindle;
   a spindle shank that is configured to be rotated in a circumferential direction (U) of the spindle, and that has a connecting piece for connecting a connecting element of a collet chuck to the spindle, and wherein the collet chuck is set up to receive a processing tool or a maintenance tool,
   wherein the shank element has a through hole in the longitudinal direction (L) of the spindle,
   wherein the connecting plate has a lubricant inlet for connection to the lubricant supply, and wherein the connecting plate has at least one separate compressed air inlet for connection to the compressed air unit, and
   wherein the connecting plate is set up such that, for maintenance of the collet chuck, the connecting plate fluidically connects the through hole of the shank element to:
   (i) the at least one compressed air inlet, and
   (ii) the lubricant inlet.

2. The spindle according to claim 1, wherein the connecting plate has a lubricant line, wherein the lubricant line protrudes into the through hole of the shank element.

3. The spindle according to claim 2, wherein the lubricant line has at least one guide element, wherein the at least one guide element has recesses and/or regionally abuts against an inner surface of the through hole of the shank element.

4. The spindle according to claim 2, wherein the shank element of the spindle is arranged so that the shank element can be displaced relative to the lubricant line in a longitudinal direction (L) of the spindle.

5. The spindle according to claim 1, wherein the connecting plate of the spindle (1) has at least one additional compressed air inlet for connection to the compressed air unit, wherein the shank element of the spindle is arranged so that the shank element can be displaced in the longitudinal direction (L) of the spindle by a compressed air supply that takes place via the at least one additional compressed air inlet.

6. The spindle according to claim 1, wherein the connecting plate is discoidal, wherein the lubricant inlet and/or at least one of the compressed air inlets is formed on an outer circumferential surface of the discoidal connecting plate.

* * * * *